Figure 1:
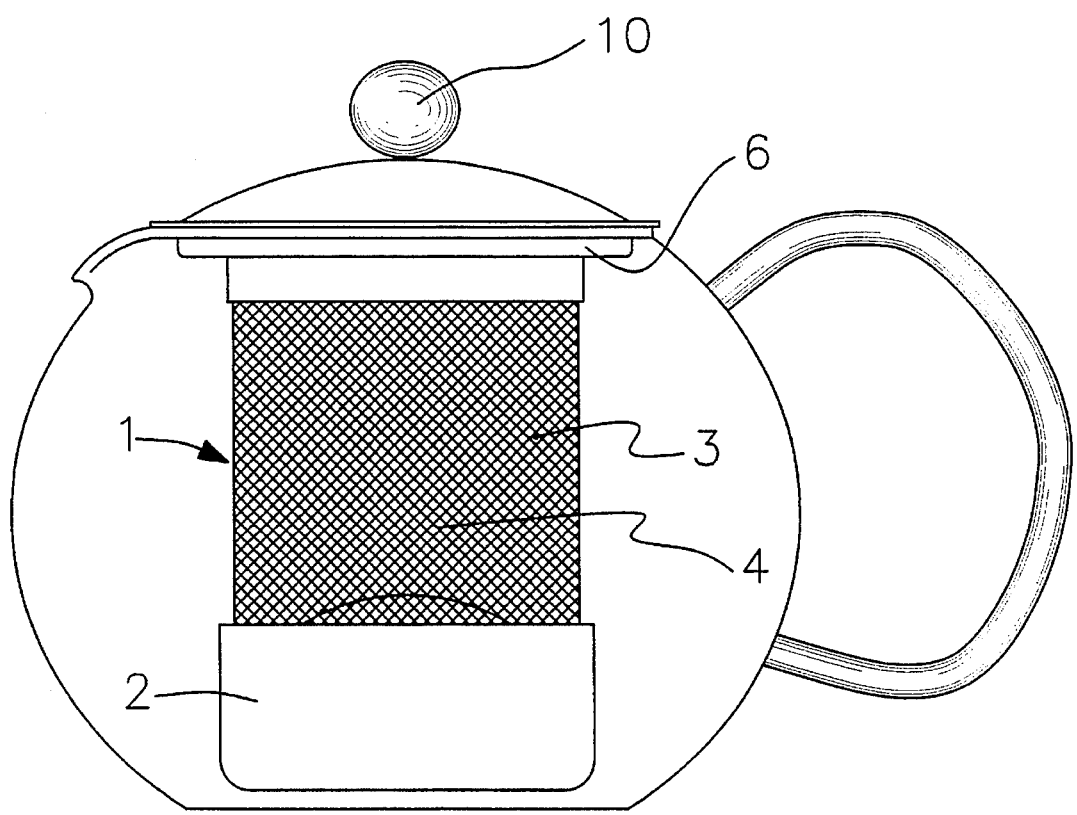

United States Patent [19]

Joergensen

[11] Patent Number: 5,453,189
[45] Date of Patent: Sep. 26, 1995

[54] FILTER INSERT FOR CONTAINERS

[76] Inventor: Carsten Joergensen, CH 6010, Kriena, Switzerland

[21] Appl. No.: 94,037

[22] Filed: Jul. 30, 1993

[30] Foreign Application Priority Data

Feb. 1, 1991 [DK] Denmark .................................. 176/91

[51] Int. Cl.⁶ .......................... B01D 35/02; A47G 19/16; A47J 31/20
[52] U.S. Cl. ......................... 210/238; 210/413; 210/473; 210/474; 210/497.01; 99/297; 99/302 P; 99/317; 99/318; 99/322
[58] Field of Search .................................... 210/232, 238, 210/413, 474, 473, 477, 451, 452, 497.01, 499; 99/279, 284, 297, 302 P, 317, 318, 319, 320, 321, 322

[56] References Cited

U.S. PATENT DOCUMENTS

| 323,780 | 8/1885 | Brown . |
|---|---|---|
| D. 343,759 | 2/1994 | Joergensen . |
| 1,098,799 | 6/1914 | Higdon . |
| 1,168,544 | 1/1916 | Newlin . |
| 1,268,858 | 6/1918 | Lewis . |
| 1,572,861 | 2/1926 | Larry . |
| 1,767,915 | 6/1930 | Bugg . |
| 1,797,672 | 3/1931 | Paolini . |
| 1,873,023 | 8/1932 | Peirce . |
| 1,887,848 | 11/1932 | Peirce . |
| 1,984,047 | 12/1934 | Thieme . |
| 2,093,980 | 9/1937 | Linger . |
| 2,338,251 | 1/1944 | Makino . |
| 2,401,529 | 6/1946 | Varney . |
| 2,808,775 | 10/1957 | Schott . |
| 3,174,424 | 3/1965 | Serio . |
| 3,324,787 | 6/1967 | McCleary . |
| 3,592,126 | 7/1971 | Dombranik . |
| 3,669,694 | 6/1972 | Nauheimer . |
| 4,365,544 | 12/1982 | Howitt . |
| 4,981,588 | 1/1991 | Paoulallion . |
| 5,059,325 | 10/1991 | Iida . |

FOREIGN PATENT DOCUMENTS

| 548225 | 6/1956 | Belgium . |
|---|---|---|
| 554405 | 2/1957 | Belgium . |
| 419796 | 1/1911 | France . |
| 1196574 | 11/1959 | France . |
| 2551899 | 6/1977 | Germany . |
| 16746 | 8/1892 | United Kingdom . |
| 3719 | 9/1906 | United Kingdom . |
| 297244 | 9/1928 | United Kingdom . |
| 314445 | 6/1929 | United Kingdom . |
| 673081 | 2/1939 | United Kingdom . |
| 755614 | 8/1956 | United Kingdom . |
| 1482293 | 12/1975 | United Kingdom . |

*Primary Examiner*—Thomas M. Lithgow
*Attorney, Agent, or Firm*—Gipple & Hale

[57] ABSTRACT

A filter insert for containers, such as tea pots, where a specific dwelling time is required for the filter pulp in the liquid held in the container, the insert consisting of a circular cylindrical filter unit, extending downwards from the top of the container at to least below the surface of the liquid in the container when being filled, and where at least one plunger shaft with a plunger sliding in a plunger guide extends axially through the upper part of the insert. The plunger is provided with a rim flange and can be moved to the bottom of the filter insert which is divided in at least two sections, a bottom part and a top part where the bottom part consists of a material, for instance plastic, which is impermeable to the liquid, and the top part mainly consists of a material permeable to the liquid, for instance a wire screen which can keep the filter pulp, and where the plunger also is impermeable and vaulted upwards, so that the central height is greater than the height at the circumference which is provided with an upright rim flange.

10 Claims, 3 Drawing Sheets

FILTER INSERT FOR CONTAINERS

The present invention relates to a filter insert for containers, in particular tea pots, where a certain dwelling time is to be secured for the filter pulp in a liquid withheld in the container, the insert consisting of a preferably circular cylindrical filter unit, extending downwards from the top of the container at least reach down below the surface of the liquid in the container when being filled, and where at least one plunger shaft with a plunger sliding in a plunger guide extends axially through the upper part, where the plunger is provided with a rim flange and can be moved to the bottom of the filter insert.

Such filter inserts are already known, for instance from FR-Patent no. 1.196.574, where both plunger and the bottom of the filter insert are perforated permit the free passage of the liquid, while tea leaves are kept inside between the plunger and the bottom of the filter inset. The plunger is provided with a reinforcing rim rib, extending towards the bottom of the filter insert. The liquid, in which the infusion takes place, is in this filter insert limited to between the lower third and half of the filter insert volume, which is insufficient for a complete infusion. Further, the infusion can not be stopped after pressing down the plunger, as infusion still takes place through the perforations in the bottom of the filter insert and in the plunger. Furthermore, the plunger during the infusion is kept in the top position, e.g. through friction, failing which it will sink and-limit the infusion volume further.

Also, it is known to use filter inserts, for instance in the form of a paper filter, which, fastened in a fixture, hang down from the top of the container. This filter insert works satisfactory, but has the problem, that the volume of infusion is relatively small, and that the filter insert after expiration of the extraction time must be taken up from the liquid so as to prevent further infusion o between the liquid and the filter pulp, after which the larger part of the liquid contained in the filter pulp normally should be squeezed out from the filter pulp and deposited after that. This can not always take place, as both the pressing and the deposit possibillities can be limited in time and locality, and besides, the mechanical strength of the paper material is limited. The need for pressing the filter pulp has arizen from the desire to reduce waste or, partly, to prevent dripping of liquid on the way between the container and the place of deposit.

Furthermore, it is known from other extraction methods to separate the filter pulp in the bottom of a cylindrical container, where a plunk, or having a diameter corresponding to the inner diameter of the container and having filtering sections is pressed down through the liquid and partly separates the filter pulp from the liquid. Thus, a sufficiently large volume of infusion is achieved and, has the problem pressing the liquid out from the filter pulp, but it is, like the state of the art known from the FR-Patent no. 1.196.574, not possible to stop the infusion totally, as there still exists a connection through the filtering sections of the plunger between the liquid and the filter pulp.

The present invention is therefore based on the object of providing the largest possible volume of infusion, to separate filter pulp and liquid in such a way, that after the separation no infusion takes place between filter pulp and liquid, and to eliminate the need for external deposit, while the largest possible quality of liquid is pressed from the filter pulp.

According to the invention the filter insert is divided in at least two sections, a bottom part and a top part, where the bottom part consists of a material, for instance plastic, which is impermeable to the liquid, and the top part mainly consists of a material permeable to the liquid, for instance a wire screen, which can keep the filter pulp, and where the plunger also is impermeable and vaulted upwards so, that the central area is higher than the circumference area, which is made with an upright rim flange.

In this embodiment of the filter insert according to the invention the advantages are obtained in, that an effective separation between filter pulp and liquid is provided, the separation occurs by a simple movement of the plunger from one extreme position to the other, and that the filtrate is accessible immediately after the separation, without first removing the filter pulp from the container and thereby risking drops and splashing liquid on the way between the container and the place of deposit for the filter pulp. Moreover, the largest possible infusion volume is secured by having the plunger floating on top of the liquid during the infusion as a result partly of the vaulted feature and partly of the upright rim flange. After the pressing down of the plunger it remains in the position, since after the submersion in the liquid loses its buoyancy capacity.

In one embodiment of the invention the top part consists of two parts, namely a filtering unit and a lid part, in which the pluger guide is placed. The lid part can be formed so, that the top part covers the filter insert totally and simultaneously operates as a lid for the extraction container.

In one preferred embodiment the permeable part of the filter insert is made with a releasable connection both to the bottom part and to the lid part, where the filter insert is equipped with a section preferably of plastic provided with grip-means suiting corresponding grip-means in the corresponding part of the bottom part or the lid part.

With this arrangement a favourable separation is provided, so that the permeable part of the filter insert, having some mechanical stability against pressure and bending force relative to plastic or glass, easily can be replaced should it be damaged. Also, an eventual cleaning is made easier with this possibility of separation.

The gripping means can, preferably, be made as screw threads, as bayonet socket or as snap-locks. It should be observed, that the wire screen is not influenced by pressure or bending forces, for which reason the assembling and the disassembling of the gripping means takes place with the least possible exersion of force.

Further appropriate embodiments of the invention appear in the dependent claims.

A filter insert according to the invention can be used as an extraction container depending on its opening diameter, if only the precondition is observed, that the wire screen during the infusion phase reaches totally down under the surface of the liquid in the container.

Figure 2:
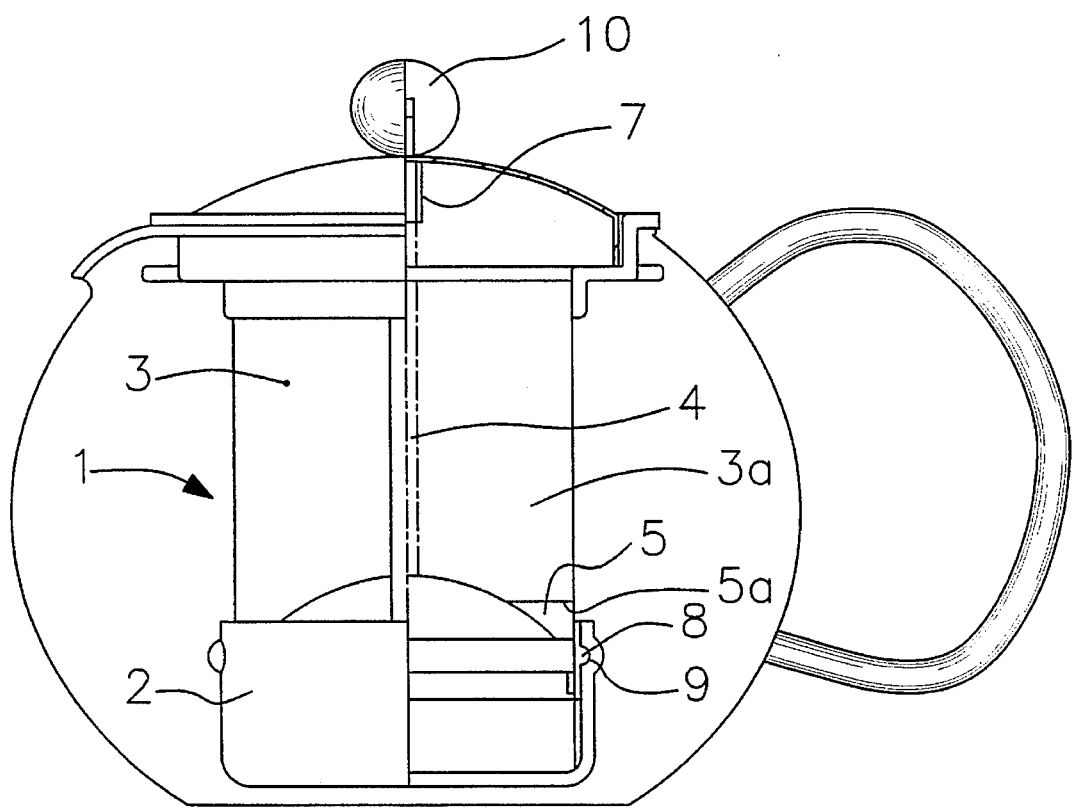
Figure 3:
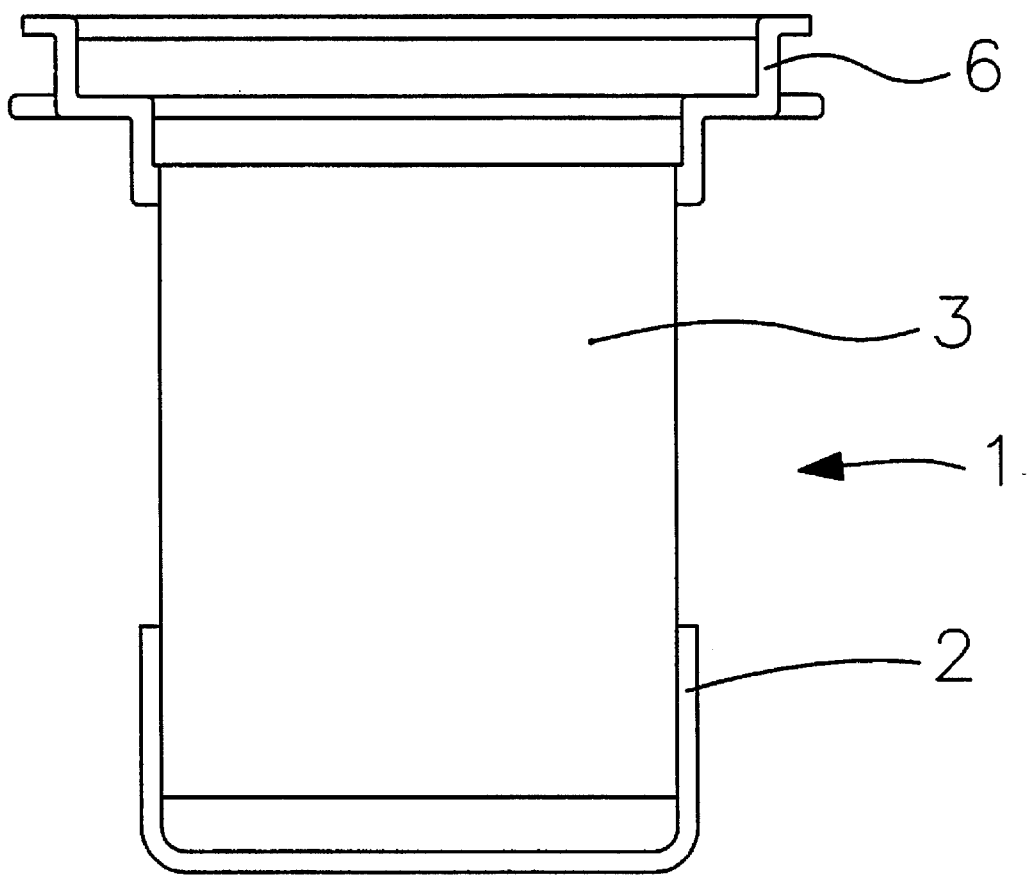

A preferred embodiment of the invention, where it is used as a filter insert in a tea pot, is elaborated in the following specification with reference to the drawing. The drawing shows on:

FIG. 1 a tea pot of glass equipped with a filter insert according
to the invention, FIG. 2 the same view as FIG. 1, but with a partly sectional view of the filter insert, and FIG. 3 a sectional view of the filter insert according to the invention.

FIG. 1 shows a tea pot of glass equipped with a filter insert 1 according to the invention. The filter insert 1 consists of a bottom part 2 and a top part 3 consisting of a wire screen 3a, which is fastened to a lid part 6 with the help of a not specificly shown coupling part. In the lid part 6 a bushing 7 is fastened as guidance for a plunger shaft 4. On top of the plunger shaft 4 a handle 10 is placed, and at the bottom of the plunger shaft 4 a plunger 5 is placed the diameter of which corresponds to the inner diameter of the wire screen 3a.

In FIG. 2 a partly sectional view of the filter insert 1 is shown, from which it can be seen, how the top part 3 is fastened to the bottom part 2. At the bottom of the wire screen 3a a coupling part is fastened, which is equipped with grip- or locking means 8 matching corresponding grip- or locking means 9 in the corresponding part of the bottom part 2. In FIG. 2 the embodiment of the grip- or locking means 8, 9 is only illustrated, as arbitrary embodiments can be used for these grip- or locking means 8, 9. In the embodiment of the grip- or locking means 8, 9 shown in FIG. 2 these have the form of an embossment 8 and a corresponding groove 9, where the embossment 8 is brought into engagement in the groove 9 by a snap effect. As earlier stated, the grip- or locking means can also be in the form of screw threads or as a bayonet socket.

FIG. 2 also shows a partial section through the plunger 5, in which it can be seen, that the upright rim 5a has a height, which in this embodiment is nearly half as high as the vault of the plunger. The height of the rim determines the buoyancy of the plunger and is be adjusted to the total weight of plunger 5, plunger shaft 4 and handle 10.

FIG. 3 shows a filter insert 1 in sectional view, where, however, no grip- or locking means 8, 9 are shown, as a separation between the bottom part 2 and the top part 3 is not absolutely necessary in order to obtain the purpose of the invention.

The lid part 6 on the top part 3 is formed so, that it has a bushing 7, which guides the plunger shaft 4. The lid part 6 and the plunger shaft 4 are assembled in a unit, which can be removed during the preparation of the tea.

On top of the plunger shaft 4 a handle 10 is placed, as earlier mentioned, in order to ease the operation of the plunger 5 and the plunger shaft 4. The handle 10, can be formed in any way. In a specially appropriate embodiment of the handle 10 it can further contain a not shown clock, which appropriately could be operated by a battery or by thermo-electrical elements driven by temperature differences. This clock could thereby measure the duration of the infusion phase, so that the correct duration of this phase is obtained. Some types of tea need an extraction time of 5 minutes and other types of tea, including Keemun tea, need extraction time of 15 minutes. The presence of the clock is not essential to the filter insert, but it eases the use of a tea pot with a filter insert according to the invention, when the use takes place far from normal kitchen timers or the like.

The process itself by using, the filter insert is not much different from the process known from other filter types, until the end of the infusion phase. After pouring, the water through the filter insert 1 the plunger 5 is placed in the top of the wire screen floating to make sure, that all the contents of the filter is below the surface of the water. After that, the lid is placed in the lid pat. Where, till now, the filter with its contents would be lifted up from the tea pot, eventually pressing tea out from the filter and successively take the filter to a deposit area, a pressure downwards should be exerted on the handle 10 with the filter insert according to the invention, whereby the plunger 5 is brought axially through the filter insert 1 down towards the bottom part 2, where the plunger 5 and the bottom part 2 together incapsulate the filter pulp after the filtrate at the same time has been pressed out from the filter pulp.

With the embodiment of the filter insert according to the invention the following, advantages are obtained in, that an effective separation between filter pulp and liquid is provided, that this separation appears by a simple movement of the plunger from one extreme position to the other, and that the filtrate is accessible immediately after the separation, without first removing the filter pulp from the container and thereby risking drops and splashing liquid on the way between the container and the place of deposit for the filter pulp.

With filter insert capable of being disassembled from the bottom part and the top part, a favourable possibility of disassembling is achieved, so that the permeable part of the filter insert easily can be replaced should it be damaged. Also, the cleaning of the filter insert is facilitated with this disassembling.

While the invention has been described with reference to a preferred embodiment, it will be apparent that improvements and modifications may be made within the purview of the invention by those of ordinary skill in the art.

I claim:

1. A filter insert for a liquid container where a specific dwelling time is to be maintained for filter pulp in said liquid, said insert is adapted to be inserted into said container, said inset being divided into an upper part for holding said filter pulp connected to a bottom part,said upper part comprising a downward extending cylindrical filter unit adapted to extend below the surface of said liquid, said filter insert further comprising a plunger attached to a plunger shaft, said plunger shaft being slidably disposed in a plunger and said plunger being slideably mounted in said cylindrical filter unit, said plunger shaft extends axially through the plunger shaft guide in said upper part of said insert, said plunger being provided with a circumferential rim flange and said plunger with said rim flange can be moved to the bottom part of the filter insert, said bottom part of the filter insert and said plunger being impermeable to said liquid and said upper part of the filter insert comprising the filter unit being permeable to said liquid, said plunger being centrally valted upward so that its central height is greater than the height of said circumferential rim flange.

2. A filter insert according to claim 1, wherein the upper part (3) consists of said filter unit (3a) and lid part (6), in which the plunger shaft guide (7) is disposed.

3. A filter insert according to claim 1 wherein the upper part (3) comprises a lid for said liquid container.

4. A filter insert according to claim 2 wherein the upper part of the filter insert (1) is made with a releasable connection both to the bottom part (2) and to the lid part (6).

5. Filter insert according to claim 2 wherein the permeable upper part (3a) of the filter insert (1) is provided with a section (3b) provided with grip-means (8) which mates with corresponding grip-means (9) in the corresponding part of the bottom part (2) or the lid part (6).

6. A filter insert according to claim 5, wherein the gripping means (8) are screw threads.

7. A filter insert according to claim 5, wherein the gripping means (8) are bayonet sockets.

8. A filter insert according to claim 5, wherein the gripping means (8) are as snaplocks.

9. The filter insert of claim 1 wherein said bottom part (2) is plastic and said filter unit is a screen.

10. The filter insert of claim 5 wherein said section (3b) is plastic.

* * * * *